Oct. 18, 1966  D. A. EDWARDS ET AL  3,279,215
SHAFT COUPLINGS
Filed Oct. 27, 1964  3 Sheets-Sheet 1
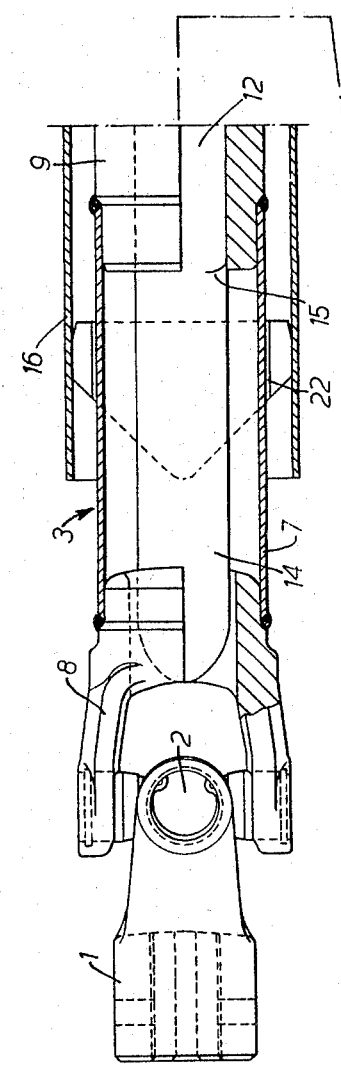
FIG. 1.
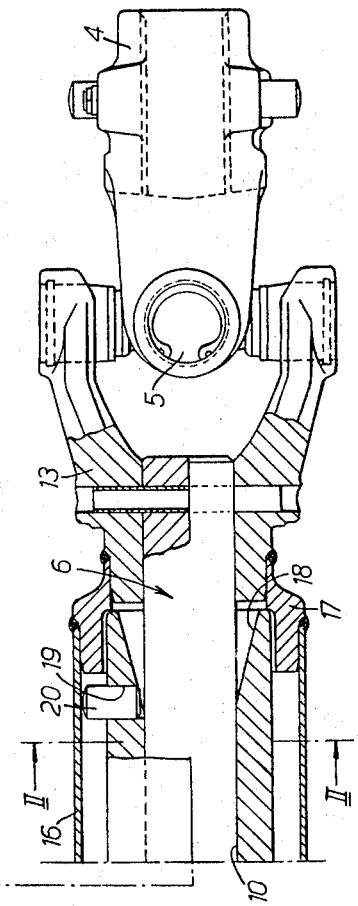
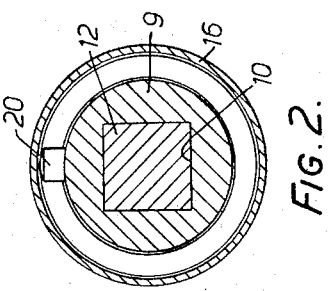
FIG. 2.
INVENTOR
DOUGLAS A. EDWARDS
JOHN H. FIELD
By Walter E. Pavlick
ATTORNEY

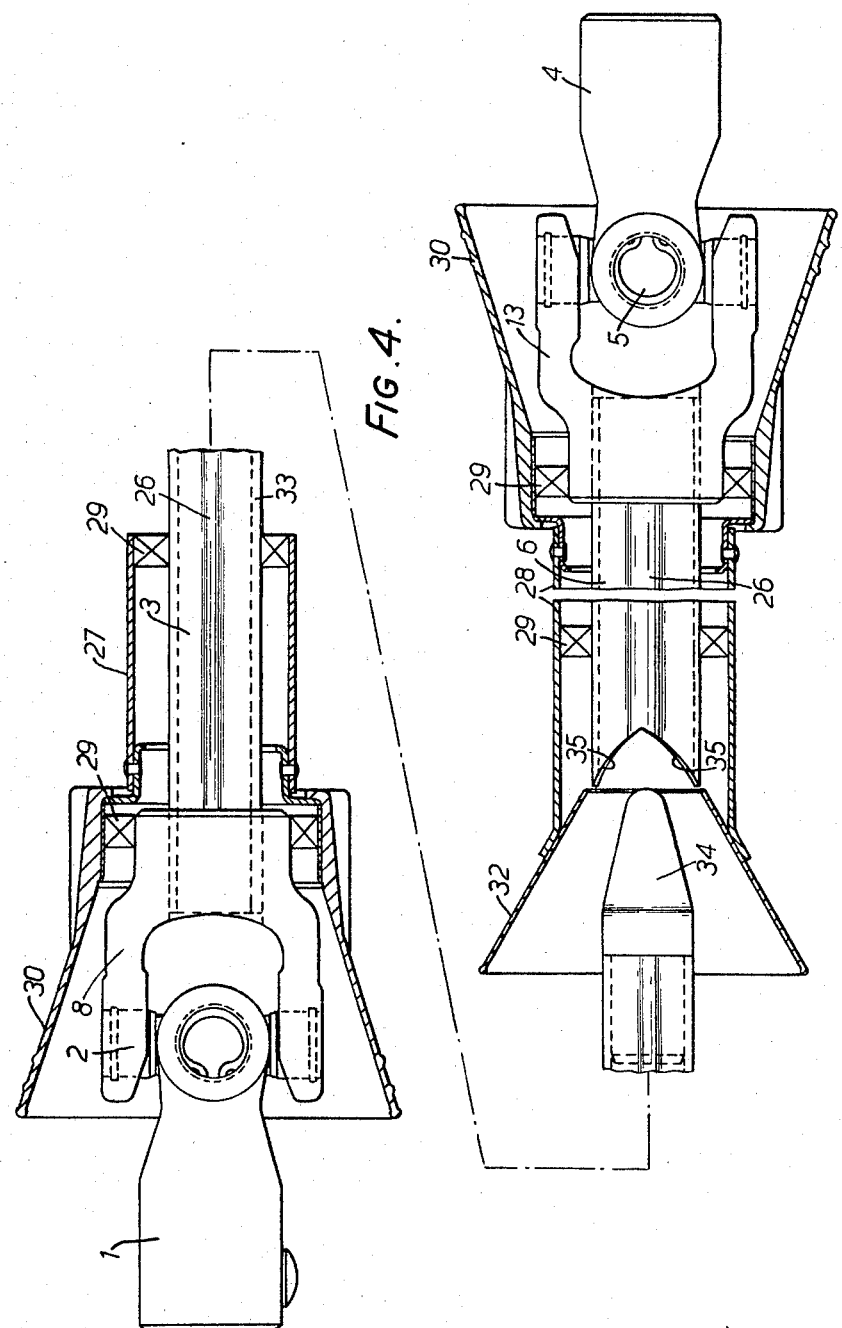

INVENTOR
DOUGLAS A. EDWARDS
JOHN H. FIELD

BY *Walter E. Pavlick*

ATTORNEY

United States Patent Office 3,279,215
Patented Oct. 18, 1966

3,279,215
SHAFT COUPLINGS
Douglas Austen Edwards, Walsall, and John Henry Field, Yardley, Birmingham, England, assignors to Birfield Engineering Limited, London, England
Filed Oct. 27, 1964, Ser. No. 406,724
Claims priority, application Great Britain, Oct. 29, 1963, 42,519/63; Aug. 12, 1964, 32,802/64
16 Claims. (Cl. 64—4)

This invention relates to disconnectable couplings between two rotary torque transmitting shafts.

It is an object of the invention to provide an improved form of coupling which will provide automatic circumferential alignment between two rotary torque transmitting shafts as they are made to approach one another in a first axial endwise direction. The invention is particularly though not exclusively applicable to shaft couplings for use between the power take-off shaft of a tractor and the input shaft of an implement. For convenience it is desirable that a connection can be made between the two shafts merely by backing the tractor up to the implement, and without the tractor driver having to dismount. It is, therefore, desirable that the two parts of the shaft coupling should be self-centering in addition to being self-aligning circumferentially.

Accordingly the invention consists in an automatic coupling between two rotary torque transmitting shafts, in which one shaft is provided with a female internally tapered member substantially in the form of a truncated cone, and the other shaft with a male probe, to provide coaxial alignment between the shafts as they are made to approach one another in a first axial endwise direction, and in which one shaft is formed with at least two angularly spaced guide surfaces forming camming surface means which are inclined relatively to the shaft axis and each extending over an effective guiding angle of at least 90° subtended at that axis, and the other shaft has a radial projection which engages with one or other of said camming surfaces as the shafts approach one another, so as to afford circumferential alignment between the shafts.

Preferably the two shafts are formed with interengaging formations to afford torque transmission when fully engaged in an axial endwise direction. To this end the shaft with the probe may be of polygonal or square cross-section, the probe being a round-nosed length of round bar the diameter of which is equal to the distance across the flats of the square shaft section. The other shaft, which may have a corresponding polygonal or square section hole, may be formed integrally with said female tapered member.

Thus in one preferred construction one shaft has an open-ended square section socket, to receive the end of the probe of a square-section shaft. The arrangement is preferably such that the shafts can only be fully engaged in either of two circumferential positions displaced by 180°.

The inclined guide surfaces may be of generally helical form disposed symmetrically with respect to the corresponding shaft axis. They may be provided on the shaft which is also provided with the probe, in which case they are preferably formed within a guide sleeve which coaxially surrounds that shaft and within which said internally tapered member is received when the shafts are coupled.

When the shaft provided with the internally tapered member, which is in the form of a truncated cone, is formed with the guide surfaces they may be formed by cutting away the end of a hollow tube forming that shaft. In this case the shafts conveniently comprise hollow tubes of generally polygonal or lemon-shaped cross-section one of which fits telescopically within the other and the outer of which is cut away at its one end to provide the camming surface means. Each tube has two diametrically opposed longitudinally extending and outwardly projecting ribs—the ribs on the inner tube engage respectively within the ribs on the outer tube.

The camming surfaces may be formed by cutting away the end of the outer tube on two generally helical paths similar in effect to a two-start screw thread which affords circumferential alignment within a range of 180°. Alternatively the end may be cut away on four generally helical paths, two "left-handed" and two "right-handed." This provides two "peaks" and two intervening "troughs" which afford circumferential rotation in either direction of rotation within a range of 90° and circumferential alignment to two positions displaced one from the other by 180°.

The invention is as stated particularly applicable to shaft couplings between tractors and implements, especially for agricultural purposes. Torque transmitting shafts for this purpose normally require two spaced universal joints to accommodate the movement between the tractor and implement. It is theoretically possible to provide the shaft coupling in front of or behind the two joints but according to another preferred feature of the invention the coupling is provided between the two universal joints. This is of advantage in many ways: it makes both the tractor and implement more adaptable for use with other items of equipment, and it makes possible certain constructional designs which facilitate the automatic operation of the coupling.

Thus the invention also resides in a tractor or implement (which terms is to be understood to include a trailer), including one half of an automatic coupling as defined above.

To preserve the closest approximation to constant velocity characteristics between the two ends of the transmission shaft the two universal joints, if of the Hooke's joint type, should be properly aligned circumferentially with one another. This alignment must be within a range of 180°, or in other words one shaft can be aligned circumferentially to either of two positions relative to the other shaft. An automatic coupling which provides circumferential alignment over 180° is, therefore, capable of preserving approximately constant velocity characteristics, assuming that the input and output shafts are approximately parallel.

In addition the invention resides in a tractor and implement combination the tractor having a power take-off shaft and the implement having an input shaft and including an automatic coupling between the two shafts, as defined above. The complete shaft assembly will normally include two universal joints of the Hooke's joint type arranged in series, with the coupling preferably between the two joints. At least one of the shafts and preferably both, employs a resilient suspension with respect to the tractor or implement as the case may be. The shafts may be suspended on springs attached to two halves of a transmission shaft guard arranged to enclose the two shafts when coupled and mounted on the latter through suitable bearings.

The invention will now be more particularly described with reference to the accompanying drawings which illustrate, by way of example, two agricultural torque transmitting shaft arrangements employing distinct forms of couplings in accordance with the invention. In the drawings:

FIGURE 1 is a longitudinal sectional view of one of the arrangements,

FIGURE 2 is a sectional view on the line II—II in FIGURE 1,

FIGURE 4 is a view generally similar to that of FIGURE 1 but of the other arrangement.

Figure 5:
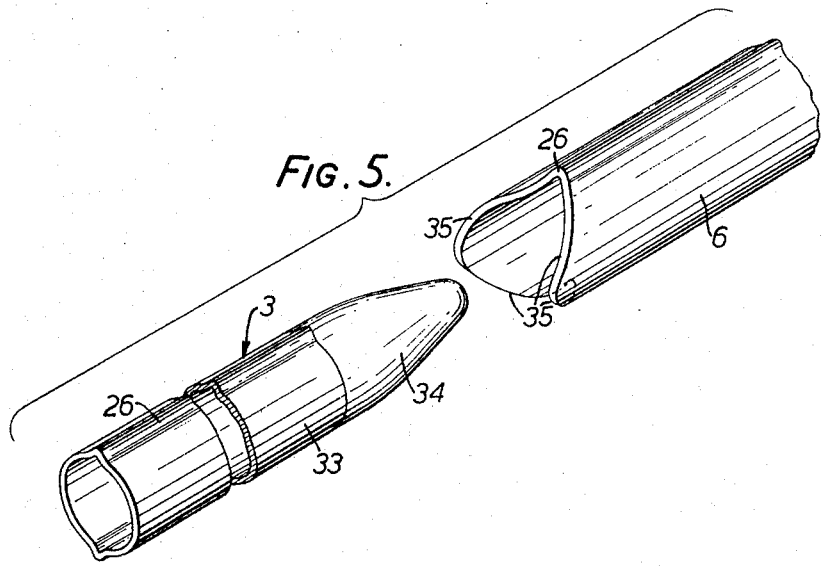
FIGURE 5 is a detail perspective view of the arrangement of FIGURE 4.

In each case the arrangement is designed to form a connection between the power take-off shaft of an agricultural tractor and the input drive shaft of an agricultural implement. In use the rearwardly projecting take-off shaft of the tractor (not illustrated) is received within a yoke 1 of a Hooke's type universal joint 2 which is attached to the front end of a coupling shaft 3. The power input shaft of the implement (also not illustrated) extends forwards and is similarly received within a quick-release yoke 4 of another Hooke's type universal joint 5. The joint 5 is connected to the rear end of a coupling shaft 6. One of the coupling shafts can be received coaxially within the other to establish a drive between the universal joints 2 and 5, the coupling shafts 3 and 6 being of non-circular or complemental polygonal cross-sections for this purpose as will be described.

Dealing now more specifically with the arrangement of FIGURE 1, the shaft 3 comprises a thin-walled tubular section 7 attached at one end directly to the adjacent yoke 8 of the universal joint 2 and attached at the other end to a shaft socket section 9. As shown more particularly in FIGURE 2 the shaft section 9 has a central through hole 10 of square shape which corresponds to the cross-section of a rear section 12 of the shaft 6. The shaft section 12 is received within and fixed to the adjacent yoke 13 of the universal joint 5. A leading section 14 of the shaft 6 is machined, up to a shoulder 15, to provide a male probe section of circular cross-section the diameter of which is equal to the distance across the flats of the square shaft section 12.

A guide sleeve 16 of circular cross-section is welded to an adaptor sleeve 17 which is in turn welded to the yoke 13 so that the sleeve 16 coaxially surrounds the coupling shaft 6. The sleeve completely overlaps the square shaft section 12 and also partially overlaps the probe section 14. At the outer end the central hole 10 in the section 9 of the coupling shaft 3 has an outwardly and conically flared mouth 18 substantially in the form of a truncated cone; thus the leading end of the forward shaft 3 (considered as the tractor is backed up to the implement) is flared to provide in effect an integral female internally tapered member represented by the mouth portion of the shaft section 9.

Figure 3:
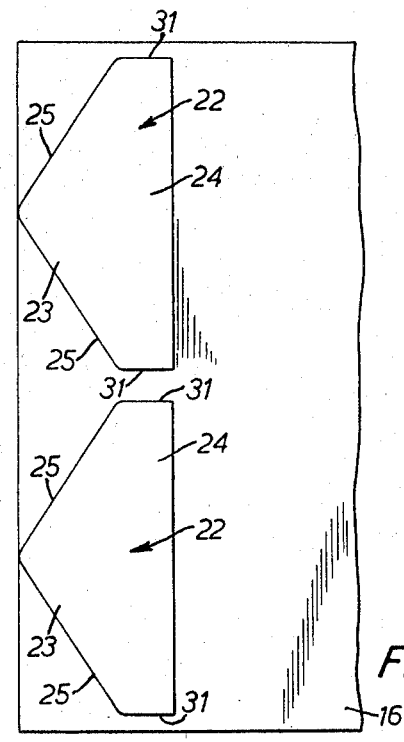
FIGURE 3 is a detail developed view.

The shaft section 9 has a radial bore 19 in which is fitted a projecting means in the form of a phasing pin 20 which acts in a manner which will be described to ensure that the universal joints 2 and 5 are correctly phased when the shafts 3 and 6 are fully engaged. The pin 20 projects radially from the shaft section 9 adjacent the inner end of the flared mouth 18 of the square section hole 10. At the leading open end the guide sleeve 16 has attached to its inner surface two diametrically opposed guide blocks 22 which in a developed view (as shown in FIGURE 3) have a generally triangular outer end section 23 which adjoins a rectangular inner end section 24.

The triangular end of each guide block 22 presents two outwardly facing generally helical guide surfaces 25 each of which leads towards one of the side faces 31 of the inner end sections 24. These side faces 31 define indexing means which are in each case just of sufficient width to provide free passage for the phasing pin 20. Thus the shafts 3 and 6 can only be fully engaged by passing the phasing pin 20 between the guide blocks, i.e. in one or other of two circumferential positions spaced apart by 180° and either of which provides correct phasing of the universal joints. The shaft sections 7 and 12 are so connected to the yoke members 8 and 13 respectively that when the joints 2 and 5 are correctly phased the square section of the shaft 6 is aligned with the square-section hole 10.

In the arrangement of FIGURES 4 and 5 the shafts 3 and 6 are each of tubular form and lemon-shaped in cross-section, as clearly seen in the perspective view of FIGURE 5 which merely illustrates the shafts themselves before fitting to the universal joint yokes 8 and 13. As can be seen clearly in that figure each shaft 3 or 6 has a wall of generally circular shape with two diametrically opposed longitudinally extending and outwardly projecting ribs 26 to provide the lemon-shaped profile. The ribs 26 extend the full length of the tubing and the shaft 3 fits telescopically within the shaft 6; thus the ribs 26 on the shaft 3 engage within the ribs 26 on the shaft 6, the latter ribs in effect providing internal channels in the wall of the corresponding tubes, and it is through the interengaging ribs that the drive torque is transmitted.

A transmission shaft guard has two nonrotatable sections 27 and 28 which respectively coaxially surround the shafts 3 and 6 and are mounted thereon through ball bearings 29. The guard sections 27 and 28 have flared end portions 30 which respectively shroud and guard the universal joints 2 and 5, and at its forward end the guard section 28 is connected to a frusto-conical guide 32 which forms a female internally tapered member of truncated conical shape corresponding in function to the flared mouth 18 of the first arrangement. The use of a non-rotating shaft guard is common practice with an agricultural transmission shaft and a generally similar guard will normally be utilised with the arrangement of FIGURES 1 to 3 although not illustrated therein; in this case the frusto-conical guide 32 is not required.

The coupling shaft 3 comprises the tubular lemon-shaped section 33 which has already been described and to the end of which is rigidly attached a blunt-nosed tapered probe 34 which may be of a somewhat resilient material such as synthetic rubber. The leading end of the tube forming the shaft 6, i.e. the end remote from the yoke 13, is formed with diametrically opposed cut-away V-notches providing four generally helical surfaces 35 inclined at approximately 45° to the tube axis and extending from two "peaks" to two intervening "troughs." As clearly shown in FIGURES 4 and 5 the troughs are centred on the circumferentially disposed positions of the ribs 26 on the shaft 6. The surfaces 35 thus provide guide surfaces each of which leads to one or other of the ribs 26 which form channels as well as the indexing means for phasingly aligning the shafts within which the ribs 26 on the shaft section 33 are received when the shafts 3 and 6 are coupled.

Figure 6:
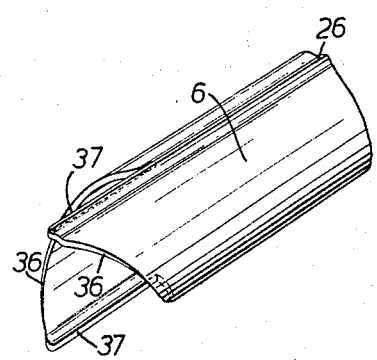
FIGURE 6 is a detail perspective view of a minor modification.

FIGURE 6 illustrates a minor modification in that the end of the tube forming the shaft 6 is differently cut away as shown to provide only two generally helical camming surfaces 36 which lead in the same direction in the manner of a two-start screw thread. The camming surfaces 36 result from two cut-away notches at diametrically opposite positions in the tube wall, each notch having an edge 37 parallel to the longitudinal shaft axis and an edge inclined at approximately 45° thereto and providing the camming surfaces 36, each of the latter of which extends around an arc of 180°.

To couple the tractor power take-off shaft 3 with the implement drive shaft 6 in each arrangement the tractor is merely reversed with the height of the normal tractor linkage (not shown) adjusted so that the probe 14, or 34, enters into the flared mouth 18 of the shaft section 9 or the tapered guide 32 as the case may be. The two guard sections when fitted are normally each supported from the chassis of the respective vehicle by means of a resilient suspension, conveniently through tension springs, so that the shafts 3 and 6 are normally held in an approximately horizontal attitude with the shaft 3 supported from the aforesaid tractor linkage. After the probe enters the mouth 18 or guide 32 further reversing movement of the tractor causes the probe to enter the square hole 10, or the shaft 6 as the case may be, and automatically aligns the shafts 3 and 6 axially.

Continued reversing movement brings the phasing pin 20 into engagement with one of the guide surfaces 25 in the arrangement of FIGURES 1 to 3, and as the pin 20 is cammed along that surface the two shafts 3 and 6 are automatically orientated in the circumferential sense until the pin can pass through one of the indexing means between the two guide blocks 24. In the case of the other arrangement the ribs 26 on the shaft 3 engage two of the helical surfaces 35, or the surfaces 36, along which they will be cammed until they are in circumferential alignment with the ribs providing the indexing means in the shaft 6. In either case the shafts 3 and 6 are now correctly phased and further reversing movement engages the shaft 3 fully within the shaft 6 to form a solid torsional transmission connection which is correctly aligned both axially and angularly.

We claim:

1. A coupling device adapted to couple two rotary torque transmitting members together for unitary rotation comprising in combination, a first rotary shaft having an axis, a second rotary shaft having an axis and being coupled to said first rotary shaft for unitary coaxial rotation therewith, coupling means including portions carried by each of said rotary shaft members and having at least one drivingly engaged position for the transmission of torque in which position said shafts are in a phased relationship, indexing means carried by one of said portions, projecting means carried by the other of said portions and projecting radially therefrom and received in said indexing means when said shafts are in their phased relationship, and camming surface means carried by said one portion and engageable with said projecting means prior to the latter being received in said indexing means as said shafts move in an axial direction toward each other and are circumferentially displaced from their phased relationship for circumferentially camming said projecting means into circumferential alignment with said indexing means and phasingly aligning said shafts.

2. A coupling device adapted to couple two rotary torque transmitting members together for unitary rotation comprising in combination, a first rotary shaft having an axis, a second rotary shaft having an axis and being coupled to said first rotary shaft for unitary coaxial rotation therewith, coupling means including portions carried by each of said rotary shaft members and having at least one drivingly engaged position for the transmission of torque in which position said shafts are in a phased relationship, indexing means having opposed circumferential extremities carried by one of said portions, camming surface means carried by said one portion and extending circumferentially between the extremities of said indexing means in a direction which is both axial and transverse with respect to said indexing means, means projecting radially from the other of said portions and cammingly engageable with said guide surface means and received in said indexing means and being cammed by said camming surface means into alignment with said indexing means as said portions approach each other in a circumferentially displaced relationship from their drivingly engaged position in an axial direction for phasingly aligning said shafts.

3. A coupling device adapted to couple two rotary torque transmitting members together for unitary rotation comprising in combination, a first rotary shaft having an axis, a second rotary shaft having an axis and being coupled to said first rotary shaft for unitary coaxial rotation therewith, coupling means including portions carried by each of said rotary shaft members and having at least one drivingly engaged position for the transmission of torque in which position said shafts are in a phased relationship, a pair of diametrically opposed indexing means and two circumferentially spaced camming surfaces extending circumferentially between said indexing means carried by one of said portions, said camming surfaces having axial and transverse components so as to be inclined relative to the axis of said one portion, a projection carried by said other portion and received in said indexing means and extending radially with respect to the axis of said other portion and cammingly engageable with either of said camming surfaces for being circumferentially cammed into alignment with said indexing means as said projection approaches said indexing means in an axial direction and with said indexing means and said projection being circumferentially displaced whereby said coupling means of said shafts automatically circumferentially align said shafts in said phased relationship.

4. A coupling device adapted to couple two rotary torque transmitting members together for unitary rotation comprising in combination, a first rotary shaft having an axis and being provided with a piloting receiving portion, a second rotary shaft having an axis and being provided with a pilotable probe received in said receiving portion and pilotable by said portion into a coaxially aligned relationship for axially aligning said shafts as they approach each other in a first axial direction, coupling means including portions carried by each of said rotary shaft members and having at least one drivingly engaged position for the transmission of torque in which position said shafts are in a phased relationshp, indexing means carried by one of said portions, projecting means carried by the other of said portions and projecting radially therefrom and received in said indexing means when said shafts are in their phased relationship, and camming surface means carried by said one portion and engageable with said projecting means prior to the latter being received in said indexing means as said shafts move in said first axial direction and are circumferentially displaced from their phased relationship by circumerentially camming said projecting means into circumferential alignment with said indexing means and phasingly aligning said shafts.

5. A coupling device adapted to couple two rotary torque transmitting members together for unitary rotation comprising in combination, a first rotary shaft having an axis and being provided with a piloting receiving portion, a second rotary shaft having an axis and being provided with a pilotable probe received in said receiving portion and pilotable by said portion into a coaxially aligned relationship for axially aligning said shafts as they approach each other in a first axial direction, coupling means including portions carried by each of said rotary shaft members and having at least one drivingly engaged position for the transmission of torque in which position said shafts are in a phased relationship, indexing means having opposed circumferential extremities, carried by one of said portions, camming surface means carried by said one portion and extending circumferentially between the extremities of said indexing means in a direction which is both axial and transverse with respect to said indexing means, means projecting radially from the other of said portions and cammingly engageable with said camming surface means and received in said indexing means and being cammed by said camming surface means into alignment with said indexing means as said portions approach each other in a circumferentially displaced relationship from their drivingly engaged position in said first axial direction for phasingly aligning said shafts.

6. A coupling device adapted to couple two rotary torque transmitting members together for unitary rotation comprising in combination, a first rotary shaft having an axis and being provided with a piloting receiving portion, a second rotary shaft having an axis and being provided with a pilotable probe received in said receiving portion and pilotable by said portion into a coaxially aligned relationship for axially aligning said shafts as they approach each other in a first axial direction, coupling means including portions carried by each of said rotary shaft members and having at least one drivingly engaged position for the transmission of torque in which position said shafts are in a phased relationship, a pair of diametrically opposed indexing means and two circumferentially spaced camming surfaces extending circumferentially between said indexing means carried by one of said portions, said camming surfaces having axial and transverse components so as to be inclined relative to the axis of said one portion, a projection carried by said other portion and received in said indexing means and extending radially with respect to the axis of said other portion and cammingly engageable with either of said camming surfaces for being circumferentially cammed into alignment with said indexing means as said projection approaches said indexing means in said first axial direction and with said indexing means and said projections being circumferentially displaced whereby said coupling means of said shafts automatically circumferentially align said shafts in said phased relationship.

7. A coupling device according to claim 6 wherein the piloting receiving portion of said first rotary shaft comprises a tapered tubular portion substantially in the form of a truncated cone.

8. A coupling device according to claim 6 wherein said pilotable probe of said second rotary shaft comprises a round nosed end portion for easy entry in said truncated conical receiving portion.

9. A coupling device according to claim 6 wherein the piloting receiving portion comprises a tapered tubular portion substantially in the form of a truncated cone and said pilotable probe of said second rotary shaft includes a round nosed portion for easy entry in said truncated conical receiving portion of said first shaft whereby said first and second rotary shafts are automatically axially aligned as they approach each other in said first axial direction.

10. A coupling device adapted to couple two rotary torque transmitting members together for unitary rotation comprising in combination, a first tubular rotary shaft having an axis and including first and second integrally connected tubular portions disposed in a coaxially aligned relationship, said first tubular portion including a tapered internal surface substantially in the form of truncated cone and said second tubular portion including an internal polygonal surface, said tapered surface merging with said polygonal surface, a second rotary shaft having an axis and including a torque transmitting portion having an external polygonal surface which is complementary to the polygonal internal surface of said second portion of said first rotary shaft, said external and said internal polygonal surfaces having at least one drivingly engaged position in which position said shafts are in a phased relationship, said second rotary shaft including a pilotable probe having a round nosed end adjacent the polygonal surface thereof for guided engagement with said tapered internal surface upon axial movement of said shafts for automatically axially guiding said second rotary shaft into said second tubular portion of said first shaft as they approach each other in a first axial direction, indexing means carried by said second rotary shaft, projecting means carried by said first tubular shaft and projecting radially therefrom and received in said indexing means when said shafts are in their phased relationship, and camming surface means carried by said second rotary shaft and engageable with said projecting means prior to the latter being received in said indexing means as said shafts move in said first axial direction and are circumferentially displaced from their phased relationship for circumferentially camming said projecting means into circumferential alignment with said indexing means and phasingly aligning said shafts.

11. A coupling device according to claim 10 wherein the indexing means includes opposed circumferential extremities and said camming surface means extends circumferentially therebetween in a direction which is both axial and transverse with respect to said indexing means.

12. A coupling device according to claim 10 wherein said projecting means comprises a cylindrical pin and having its cylindrical surface engageable with the camming surface means for being circumferentially cammed into alignment with said indexing means.

13. A coupling device adapted to couple two rotary transmitting members together for unitary rotation comprising in combination, a first rotary shaft having an axis and first end extending in one axial direction and including a torque transmitting portion having an external noncircular surface, a second rotary tubular shaft having an axis and receiving end opening in a second axial direction and including an internal noncircular surface complementary to the external noncircular surface of said first rotary shaft portion and telescopically receiving the same, said noncircular surfaces constituting a torque transmitting arrangement having at least one drivingly engaged position in which position said shafts are in a phased relationship, a hollow cylindrical member carried by said rotary tubular shaft and surrounding said tubular shaft, a portion having an internally tapered surface substantially in the shape of a truncated cone carried by said hollow cylindrical member and projecting outwardly in said second direction relative to said end of said second rotary shaft, probe means carried by said first end of said first rotary shaft for guided engagement with said tapered surface upon axial movement of said shafts toward each other to automatically axially guide said first shaft into said tubular portion of said second shaft, a pair of diametrically opposed projections carried by said first shaft and extending radially therefrom, and camming surface means formed on said receiving end of said second tubular shaft and engageable with said projecting means as said shafts move in an axial direction toward each other and are displaced from their phased relationshp for circumferentially camming said noncircular surfaces into circumferential alignment with each other and phasingly aligning said shafts.

14. A coupling device according to claim 13 wherein the camming surface means has axially and transversely extending components of general helical form.

15. A coupling device according to claim 13 wherein a portion of the internal noncircular surface of said second shaft comprise the indexing means and portions of said external noncircular surface of said first shaft comprise the radially extending projecting means for engagement with said camming surface means.

16. A coupling device according to claim 13 wherein the camming surface means comprise a pair of helical cam surfaces each of which terminates in the portion defining the indexing means of said noncircular surface.

References Cited by the Examiner

UNITED STATES PATENTS

| | | | |
|---|---|---|---|
| 2,869,660 | 1/1959 | Miller et al. | 180—14 |
| 2,953,000 | 9/1960 | Ressler et al. | 64—4 |
| 3,007,535 | 11/1961 | Lippke | 180—14 |
| 3,080,731 | 3/1963 | Atkinson | 64—4 |

FOREIGN PATENTS 565,060  10/1958  Canada.

MILTON KAUFMAN, *Primary Examiner.*